US012794553B2

(12) United States Patent
Matsumoto et al.

(10) Patent No.: US 12,794,553 B2
(45) Date of Patent: Nov. 10, 2026

(54) OPTICAL TRANSMISSION SYSTEM FOR DETERMINING WHETHER OPTICAL TRANSMISSION SYSTEM IS FUNCTIONING PROPER AND METHOD THEREFOR

(71) Applicant: NEC Corporation, Tokyo (JP)

(72) Inventors: Keiichi Matsumoto, Tokyo (JP); Fatih Yaman, Princeton, NJ (US)

(73) Assignee: NEC Corporation, Tokyo (JP)

( * ) Notice: Subject to any disclaimer, the term of this patent is extended or adjusted under 35 U.S.C. 154(b) by 270 days.

(21) Appl. No.: 18/616,059

(22) Filed: Mar. 25, 2024

(65) Prior Publication Data

US 2025/0300726 A1 Sep. 25, 2025

(51) Int. Cl.
*H04B 10/071* (2013.01)
*H04B 10/29* (2013.01)
*H04J 14/00* (2006.01)

(52) U.S. Cl.
CPC ........... *H04B 10/071* (2013.01); *H04B 10/29* (2013.01); *H04J 14/052* (2023.08)

(58) Field of Classification Search
CPC ...... H04B 10/071; H04B 10/29; H04J 14/052
See application file for complete search history.

(56) References Cited

U.S. PATENT DOCUMENTS 6,301,036 B1 * 10/2001 Spencer ............. H04B 10/2589 398/31
2013/0077975 A1 * 3/2013 Dvir ..................... H04B 10/071 398/66
(Continued)

FOREIGN PATENT DOCUMENTS

JP 2022507482 A 1/2022
JP 2023073596 A 5/2023
JP 7299528 B2 6/2023
(Continued)

OTHER PUBLICATIONS

Kobayashi et al, "Measurement of Inter-core Crosstalk of Multicore Fibers with Optical Time Domain Reflectometry" (published Sumitomo Electric Technical Review, No. 96, pp. 49-54, Apr. 2023).*
(Continued)

*Primary Examiner* — Casey L Kretzer
(74) *Attorney, Agent, or Firm* — HAUPTMAN HAM, LLP

(57) ABSTRACT

An optical transmission system includes a transceiver configured to output an optical signal to a first optical fiber core, wherein the first optical fiber core is configured to reflect a portion of the optical signal back toward the transceiver. The optical transmission system further includes a second optical fiber core proximate the first optical fiber core, wherein the second optical fiber core is configured to receive crosstalk of the reflected portion of the optical signal from the first optical fiber core. The optical transmission system further includes a detector configured to receive the crosstalk of the reflected portion of the optical signal and generate detection data based on the crosstalk of the reflected portion of the optical signal. The optical transmission system further includes a controller configured to receive information related to the detection data, and determine whether the optical transmission system is functioning properly based on the detection data.

14 Claims, 11 Drawing Sheets

(56) References Cited

U.S. PATENT DOCUMENTS

| | | | |
|---|---|---|---|
| 2022/0115830 A1 | 4/2022 | Yanagimachi et al. | |
| 2023/0026901 A1* | 1/2023 | Matsumoto ........ | G01K 11/3206 |

FOREIGN PATENT DOCUMENTS

| | | |
|---|---|---|
| WO | 2020171103 A1 | 8/2020 |
| WO | 2023084679 A1 | 5/2023 |
| WO | 2023157283 A1 | 8/2023 |

OTHER PUBLICATIONS

Barrera et al, “Tilted Fiber Bragg Gratings for Selective Coupling in a Multicore Optical Fiber” (published at 2018 Optical Fiber Communications Conference and Exposition (OFC), Mar. 2018).*

Office Action in JP Application No. 2025-033751, mailed Dec. 2, 2025, 14pp.

Yuto Kobayashi et al., “Measurement of Inter-core Crosstalk of Multicore Optical Fibers with Optical Time Domain Reflectometry”, Sumitomo Electric Technical Review, Japan, retrieved on Nov. 17, 2025 from URL: https://sumitomoelectric.com/kp/sites/japan/files/2023-01/download documents/J202-11.pdf>, No. 202, Jan. 2023, 6pp.

* cited by examiner

OPTICAL TRANSMISSION SYSTEM FOR DETERMINING WHETHER OPTICAL TRANSMISSION SYSTEM IS FUNCTIONING PROPER AND METHOD THEREFOR

BACKGROUND

Optical transmission systems are usable to transmit data over long distances. In some instances, optical transmission systems are used to for intercontinental data transmission through optical fiber s located along a sea floor. In some instances, monitoring of the optical transmission system is performed using a repeater output of reflected light or optical time domain reflectometer (OTDR) technology. These systems utilize a circuit for returning a portion of the optical signal transmitted along the optical fiber to a detector at a source of the optical signal. The returned light is analyzed to determine whether the optical transmission system is functioning properly.

Some optical transmission systems use a single core fiber (SCF) to carry the optical signal. Some optical transmission systems use multi core fiber (MCF) to carry the optical signal. In some instances, fan-in-fan-out (FIFO) structures are used in optical transmission systems using MCF for implementing the circuit for returning the portion of the optical signal to the detector.

SUMMARY

An aspect of this description relates to an optical transmission system. The optical transmission system includes a transceiver configured to output an optical signal to a first optical fiber core of a multi-core fiber (MCF), wherein the first optical fiber core is configured to reflect a portion of the optical signal back toward the transceiver. The optical transmission system further includes a second optical fiber core proximate the first optical fiber core, wherein the second optical fiber core is in the MCF, and the second optical fiber core is configured to receive crosstalk of the reflected portion of the optical signal from the first optical fiber core. The optical transmission system further includes a detector configured to receive the crosstalk of the reflected portion of the optical signal and generate detection data based on the crosstalk of the reflected portion of the optical signal. The optical transmission system further includes a controller configured to receive information related to the detection data, and determine whether the optical transmission system is functioning properly based on the detection data, and determine a location of a fault in the optical transmission system in response to determining that the optical transmission system is functioning improperly.

An aspect of this description relates to an optical transmission system. The optical transmission system includes a transceiver configured to output an optical signal to a first optical fiber core. The optical transmission system further includes a repeater connected to the first optical fiber core, wherein the repeater is configured to boost an intensity of the optical signal. The optical transmission system further includes a second optical fiber core proximate the first optical fiber core, wherein the second optical fiber core is configured to receive crosstalk from the first optical fiber core, and the second optical fiber core is configured to reflect a portion of the crosstalk of the optical signal back toward the transceiver. The optical transmission system further includes a detector configured to receive the reflected portion of the crosstalk of the optical signal and generate detection data based on the reflected portion of the crosstalk of the optical signal. The optical transmission system further includes a controller configured to receive information related to the detection data, determine whether the optical transmission system is functioning properly based on the detection data, and determine a location of a fault in the optical transmission system in response to determining that the optical transmission system is functioning improperly.

An aspect of this description relates to a method of determining a performance of an optical transmission system. The method includes transmitting an optical signal along a first optical fiber core. The method further includes reflecting a portion of the optical signal. The method further includes conveying the reflected portion of the optical signal to a second optical fiber core via crosstalk between the first optical fiber core and the second optical fiber core. The method further includes detecting the crosstalk of the reflected portion of the optical signal to generate detection data. The method further includes determining the performance of the optical transmission system based on the detection data. The method further includes identifying a location of a fault in the optical transmission system in response to a determination that the optical transmission system is performing improperly.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
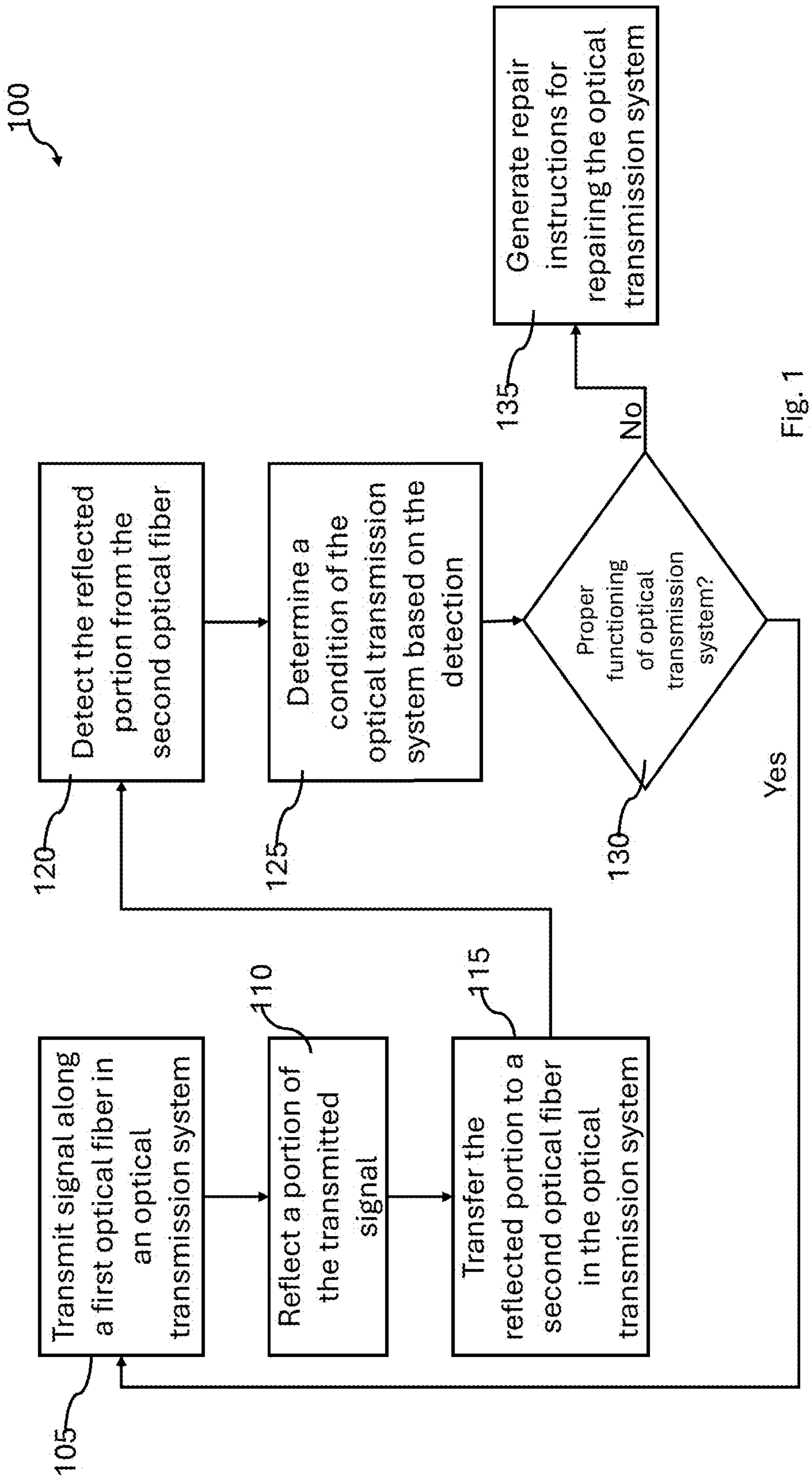
FIG. 1 is a flow chart of a method of using an optical transmission system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Optical transmission systems are often used in locations that are difficult to access. Locations such as underground or along a sea floor, i.e., a submarine optical transmission system, are difficult to access in order to conduct repairs or replacements for components of an optical transmission system. Due to the reduced ability to access portions of the optical transmission system, minimizing a number of components in the optical transmission system helps to reduce operational costs while also reducing signal deterioration associated with failure to repair or replace faulty components in the optical transmission system. Additionally, minimizing components of the optical transmission system helps to reduce an overall footprint of the optical transmission system and reduce initial installation costs.

In order to help reduce components, such as circuits, in an optical transmission system, the current description utilizes cross talk between cores to monitor performance of the optical transmission system. Cross talk is where a portion of an optical signal within one core of an optical fiber is transferred to another core within the optical fiber. Some amount of cross talk is unavoidable when an optical fiber includes more than one optical fiber core. In some embodiments, the cross talk is enhanced using a fan-in-fan-out (FIFO) device.

In some embodiments, the current description utilizes backwards cross talk to monitor performance of the optical system. Backwards cross talk is where a portion of the optical signal is reflected back towards a source of the optical signal, and this reflected portion is transferred to another optical fiber core within the optical fiber. In some embodiments, the reflection is a result of Rayleigh scattering of the optical signal as the optical signal propagates along the optical fiber core. In some embodiments, the reflection is a result of a grating introduced into the optical fiber core to cause reflection of a portion of the optical signal.

Utilizing cross talk signals in order to monitor performance of the optical transmission system reduces a number of components within the optical transmission system. The use of cross talk signals also helps to minimize or eliminate circuits within the optical transmission system. Due to difficulty in accessing portions of the optical transmission system which are underground or along a sea floor, expenses associated with repair or replacement of portions of the optical transmission system are quite large. Reducing the number of components, especially circuits, within the optical transmission system helps to reduce costs associated with repairing or replacing components in the optical transmission system. The reduction in components also reduces a number of points of potential failure in the optical transmission system, which in turn helps to minimize or reduce deterioration of the optical signals transmitted by the optical transmission system when a component fails or begins to fail. The reduced number of components also reduces the overall size of the optical transmission system, which reduces installation costs and manufacturing costs.

FIG. 1 is a flow chart of a method 100 of using an optical transmission system, in accordance with some embodiments. The method 100 is usable with optical transmission systems installed in various locations, such as underground, along a sea floor, or other suitable locations. The method 100 uses cross talk between cores in an optical fiber to determine whether the optical transmission system is working properly; and generate instructions for repairing the optical transmission system in a situation where the optical transmission system is not working properly. The method 100 is usable in optical transmission systems that include single core fiber (SCF) as well as multi core fiber (MCF). The method 100 is usable in optical transmission systems that utilize Rayleigh scattering, gratings, or other suitable reflection devices. The method 100 is usable in optical transmission systems that include fan-in-fan-out (FIFO) devices, as well as optical transmission systems that do not include FIFO devices.

In operation 105, an optical signal is transmitted along a first optical fiber core of the optical transmission system. In some embodiments, the first optical fiber core is in an SCF. In some embodiments, the first optical fiber core is in an MCF. In some embodiments, a transmitter converts an electrical signal into the optical signal. In some embodiments, the optical signal is usable to convey data along the optical fiber core. In some embodiments, the optical signal includes a pulse signal. In some embodiments, the optical signal includes random pulses. In some embodiments, the optical signal is transmitted from a transmitter that does not include a detector. In some embodiments, the optical signal is transmitted from a transmitter that includes a detector.

In operation 110, a portion of the transmitted signal is reflected. The portion is less than an entirety of the signal propagating along the optical fiber core. In some embodiments, the portion accounts for about 5% to about 20% of an intensity of the signal propagating along the optical fiber core. In some embodiments, the portion accounts for about 10% of the intensity of the signal propagating along the optical fiber core. In some embodiments, the reflection is a result of Rayleigh scattering within the optical fiber core. In some embodiments, the portion is approximately 0.05% when the reflection is a result of Rayleigh scattering. In some embodiments, the reflection is a result of the signal propagating through a FIFO device. In some embodiments, the reflection is a result if the signal encountering a grating, such as a Bragg grating, in the optical fiber core.

In operation 115, the reflected portion of the signal is transferred to a second optical fiber core in the optical transmission system. The second optical fiber core is different from the first optical fiber core. The second optical fiber core is part of a same optical fiber as the first optical fiber core. In some embodiments, the second optical fiber core is in an SCF. In some embodiments, the second optical fiber core is in an MCF. In some embodiments, the second optical fiber core is adjacent to the first optical fiber core. In some embodiments, the second optical fiber core physically contacts the first optical fiber core. In some embodiments, the transfer of the reflected portion is a result of crosstalk between the first optical fiber core and the second optical fiber core. In some embodiments, the transfer is a result of the reflected portion passing through a FIFO device.

In operation 120, the reflected portion of the signal from the second optical fiber core is detected. A detector converts the detected reflected portion of the signal into an electrical signal for processing and analysis. In some embodiments, the reflected portion is detected using a detector incorporated in a same device as the transmitter. In some embodiments, the reflected portion is detected using a detector separate from the transmitter.

In operation 125, the detected reflected portion of the signal is analyzed to determine a condition of the optical transmission system. Analysis of an intensity of the reflected portion of the signal over time is usable to determine whether the optical transmission system is functioning within a tolerance of design specifications. Analysis of the intensity of the reflected portion is also usable to identify potential locations of faults within the optical transmission system. Comparing a time of detection of an intensity peak of the reflected portion with a time since the optical signal was initially transmitted into the first optical fiber core allows a determination of how far the optical signal traveled along the optical transmission system. Using the distance traveled, a location of a potential fault within the optical transmission system is identifiable. In some embodiments, optical time domain reflectometry (OTDR) is used to identification the location of a potential fault. In some embodiments, coherent OTDR (COTDR) is used to identify the location of a potential fault. In some embodiments, the detected reflected portion of the signal is used to generate a graph for analysis of the condition of the optical transmission system. In some embodiments, the analysis is performed using a controller to automatically identify potential faults in the optical transmission system. In some embodiments, the controller uses a trained neural network (NN) to analyze the detected reflected portion of the signal to determine the condition of the optical transmission system. In some embodiments, the controller is configured to automatically generate a notification to an operator of the optical transmission system in response to detecting a potential fault within the optical transmission system. In some embodiments, the notification includes an audio notification or a visual notification to the operator. In some embodiments, the notification is transmitted to a terminal device accessible by the operator, either wirelessly or using a wired connection. In some embodiments, the notification includes information related to recommendations for addressing the potential fault in the optical transmission system. In some embodiments, the controller is configured to receive instructions from the operator for additional analysis of the detected reflected portion of the signal. In some embodiments, the additional analysis includes review of historical data, review of environmental factors surrounding the optical transmission system, review of repair options for the optical transmission system, or other suitable analysis.

In operation 130, a determination is made regarding whether the optical transmission system is functioning properly. Functioning properly means operating within error tolerance for the optical transmission system. The determination of proper functioning is made based on analysis of an intensity of the reflected portion of the signal detected. In some embodiments, a threshold value is used to determine whether an anomaly within the detected reflected portion of the signal is likely to be a fault within the optical transmission system. In some embodiments, identification of a potential fault is transmitted to the operator of the optical transmission system, either wirelessly or via a wired connection, for verification prior to finalizing a determination of improper functioning. In some embodiments, the determination of improper functioning is made automatically without verification from the operator of the optical transmission system.

In response to a determination that the optical transmission system is functioning properly, the method 100 returns to operation 105 and continues transmitting optical signals and monitoring performance of the optical transmission system. In response to a determination that the optical transmission system is not functioning properly, the method 100 proceeds to operation 135. In some embodiments, if the improper functioning of the optical transmission system is less than a second threshold value of variance from expected operation, the method 100 both proceeds to operation 135 and returns to operation 105 to allow the optical transmission system to continue operating while the fault is repaired or corrected. Utilizing the second threshold value helps to avoid a situation where the optical transmission system is prevented from continuing to operate in a state where the optical transmission system is still usable albeit with reduced accuracy or precision.

In operation 135, repair instructions are generated for repairing the optical transmission system. The repair instructions include information related to recommendations for how to resolve or reduce one or more faults determined to impact performance of the optical transmission system. In some embodiments, the operation 135 is implemented using a same controller as at least one of operation 125 or operation 130. In some embodiments, the operation 135 is implemented using a different controller from that used in both operation 125 and operation 130. In some embodiments, the repair instructions include a location of each of the one or more faults. In some embodiments, the repair instructions include a recommendation regarding whether a component of the optical transmission system is to be repaired or replaced. In some embodiments, the repair instructions are transmitted to the operator of the optical transmission system, either wirelessly or via a wired connection, for verification prior to transmission of the repair instructions to a repair technician. In some embodiments, the repair instructions are transmitted to the repair technician without verification by the operator. In some embodiments, verification by the operator is requested based on a type of repair recommended by the repair instructions. For example, in some embodiments where the type of repair includes restarting or rebooting of a component of the optical transmission system, the repair instructions are transmitted without verification either to the repair technician or directly to the component of the optical transmission system to be restarted or rebooted. In some embodiments where the type of repair includes physical interaction with the optical transmission system, e.g., by repair or replacement of a component, the repair instructions are verified prior to transmitting the repair instructions to the repair technician.

One of ordinary skill in the art would recognize that modification of the method 100 is within the scope of this description. In some embodiments, at least one operation of the method 100 is omitted. For example, in some embodiments, the operation 135 is omitted and the operator will determine the types of repairs for the optical transmission system in response to an identified fault. In some embodiments, at least one additional operation is included in the method 100. For example, in some embodiments, in response to identifying a potential fault, the optical transmission system transmits a probe signal for further diagnosing the potential fault. In some embodiments, an order of operations of the method 100 is altered. For example, in some embodiments, the operation 115 is performed prior to the operation 110. In optical transmission systems that include FIFO devices, the FIFO device potentially induces crosstalk between optical fiber cores. As a result, the crosstalk induced by the FIFO device potentially occurs prior to reflection of the portion of the optical signal.

The method 100 is usable to monitor performance of an optical transmission system. In comparison with other approaches, the optical transmission system is able to avoid introducing additional components, such as optical circuits, into the optical transmission system for returning the reflected portion of the optical signal to the detector. As a result, complexity of the optical transmission system is reduced in comparison to other approaches. In addition, a number of potential points of fault within the optical transmission system is reduced; and a cost for repair and installation of the optical transmission system is reduced in comparison with other approaches.

Figure 2A:
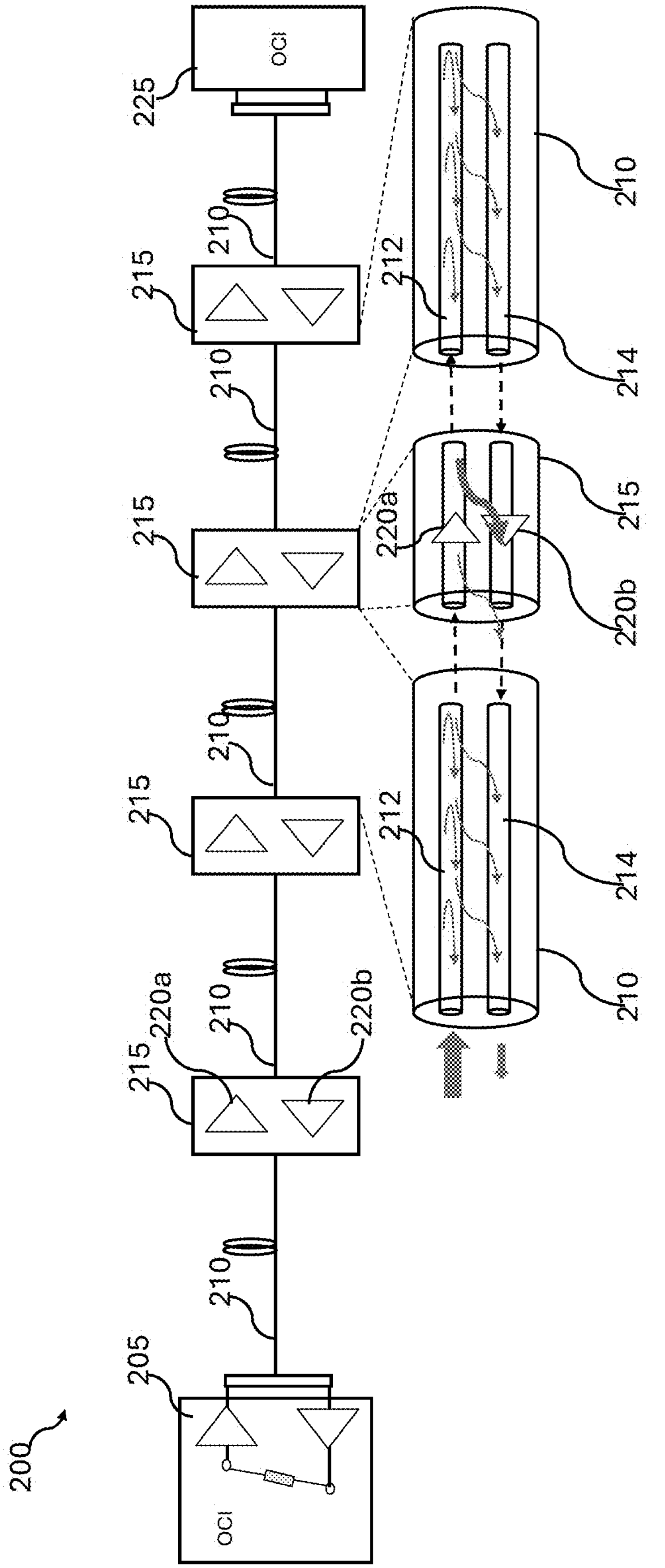
FIG. 2A is a schematic diagram of an optical transmission system, in accordance with some embodiments.

FIG. 2A is a schematic diagram of an optical transmission system 200, in accordance with some embodiments. In some embodiments, the optical transmission system 200 is usable to implement the method 100 (FIG. 1). In some embodiments, the optical transmission system 200 is usable to implement a method other than the method 100. The optical transmission system 200 includes a transceiver 205 configured to transmit an optical signal along an optical fiber 210 and to receive a reflected signal from the optical fiber 210. The optical transmission system 200 further includes a plurality of repeaters 215 spaced along the optical fiber 210 in order to boost an intensity of the optical signal. The optical transmission system 200 further includes a transceiver 225 on an opposite end of the optical fiber 210 from the transceiver 205. In some embodiments, the transceiver 225 has a same or similar structure as the transceiver 205. In some embodiments, at least one of the transceiver 205 or the transceiver 225 is configured to communicate with a controller, such as controller 700 (FIG. 7) for analyzing performance of the optical transmission system 200. For the sake of simplicity a propagation direction from the transceiver 205 toward the transceiver 225 is called a forward direction; and a propagation direction from the transceiver 225 toward the transceiver 205 is called a backward direction. One of ordinary skill in the art would understand that this description is application to either transceiver 205 or transceiver 225 being a source of an optical signal; and that the above directions are used simply for clarity of description.

The transceiver 205 includes a transmitter configured to output an optical signal received by the optical fiber 210. The transmitter is configured to convert an electrical signal into the optical signal. In some embodiments, the optical signal is a pulse signal. In some embodiments, the transmitter is configured to implement the operation 105 of the method 100 (FIG. 1). The transceiver 205 further includes a detector configured to receive a reflected portion of the optical signal from the optical fiber 210. The detector is configured to convert the received reflected portion of the optical signal into an electrical signal. In some embodiments, the detector is configured to implement the operation 120 of the method 100 (FIG. 1). The transceiver 205 is configured to provide the electrical signal from the detector to a controller, such as controller 700 (FIG. 7) for analysis of performance of the optical transmission system 200. In some embodiments, the controller is integrated into the transceiver 205. In some embodiments, the controller is separate from the transceiver 205.

The optical fiber 210 is configured to convey the optical signal from the transceiver 205 to the transceiver 225. The optical fiber 210 includes multiple optical fiber core cores housed within the optical fiber 210. In some embodiments, the optical fiber 210 includes two optical fiber core cores. In some embodiments, the optical fiber includes more than two optical fiber core cores. In some embodiments, the optical fiber 210 includes SCF optical fiber core cores. In some embodiments, the optical fiber 210 includes MCF optical fiber core cores. Optical fiber core cores within the optical fiber 210 are in close proximity with one another permitting crosstalk between the optical fiber cores. In some embodiments, at least two of the optical fiber core cores within the optical fiber 210 are in direct physical contact.

The optical transmission system 200 further includes repeaters 215 spaced along the optical fiber 210. The repeaters 215 are configured to boost an intensity of the optical signal propagating along the optical fiber 210. As the optical signal propagates along the optical fiber 210, intensity of the optical signal declines due to reflection of the optical signal, crosstalk, diffusion, or other interactions that reduce the intensity of the optical signal. If an intensity of the optical signal is too low when the optical signal reaches the transceiver 225, the transceiver 225 will have difficulty in accurately converting the optical signal into an electrical signal. The repeater 215 is configured to boost the intensity of the optical signal toward an initial intensity of the optical signal, so that upon reaching the transceiver 225, the transceiver 225 is able to reliably detect the optical signal and convert the optical signal into a usable electrical signal.

The repeater 215 includes a plurality of optical amplifiers 220*a* and 220*b*. In some embodiments, each of the optical amplifiers 220*a* and 220*b* include an erbium-doped fiber (EDF). In some embodiments, each of the optical amplifiers 220*a* and 220*b* includes a multi-core EDF when the first optical fiber core 212 and the second optical fiber core 214 are MCF. In some embodiments, each of the optical amplifiers 220*a* and 220*b* includes a single core EDF when the first optical fiber core 212 and the second optical fiber core 214 are SCF. The repeater 215 in FIG. 2A includes one optical amplifier 220*a* for forward propagation and one optical amplifier 220*b* for backward propagation. One of ordinary skill in the art would recognize that additional optical amplifiers are within the scope of this description.

The optical transmission 200 further includes the transceiver 225. The transceiver 225 is configured to receive the optical signal output by the transceiver 205. In some embodiments, the transceiver 225 includes a same or similar structure as the transceiver 205.

FIG. 2A includes enlarged sections of the optical fiber 210 and a repeater 215. These enlarged sections provide additional details of the optical fiber 210 and the repeater 215 to assist in understanding of the current description. The optical fiber 210 includes a first optical fiber core 212 configured to carry the optical signal during forward propagation. The optical fiber 210 includes a second optical fiber core 214 configured to carry the optical signal during backward propagation. One of ordinary skill in the art would understand that more than two optical fiber core cores within the optical fiber 210 is contemplated by this description. The optical amplifier 220*a* is connected to the first optical fiber core 212 for boosting the intensity of the optical signal as the optical signal propagates along the first optical fiber core 212. The optical amplifier 220*b* is connected to the second optical fiber core 214 to boost the intensity of the optical signal as the optical signal propagates along the second optical fiber core 214.

During operation of the optical transmission system 200, a portion of the optical signal propagating along the first optical fiber core 212 is reflected backward toward the transceiver 205. In some instances, this reflection is a result of Rayleigh scattering. In some embodiments, this reflection is a result of the optical signal encountering an interface between the first optical fiber core 212 and the optical amplifier 220*a*. The reflected portion of the optical signal is conceptually depicted in FIG. 2A by the arrows which indicate a change of direction but remain within the first optical fiber core 212.

Further, during operation of the optical transmission system 200, some portion of the reflected optical signal propagating backward through the first optical fiber core 212 is transferred to the second optical fiber core 214 by crosstalk. Crosstalk occurs between the first optical fiber core 212 and the second optical fiber core 214 due to proximity of the optical fiber cores and optical coupling between the optical fiber cores. The crosstalk portion of the optical fiber core is conceptually depicted in FIG. 2A by the arrows which exit the first optical fiber core 212 and enter the second optical fiber core 214.

The detector in transceiver 205 is configured to detect the crosstalk portion of the reflected optical signal from the second optical fiber core 214. Analyzing the output of the detection of the crosstalk portion of the reflected optical signal helps to determine performance of the optical transmission system 200. In some embodiments, analysis of the crosstalk portion of the reflected optical signal is implemented as described above with respect to the method 100 (FIG. 1). In some embodiments, the analysis of the crosstalk portion of the reflected optical signal is implemented using a method other than the method 100 (FIG. 1).

Figure 2B:
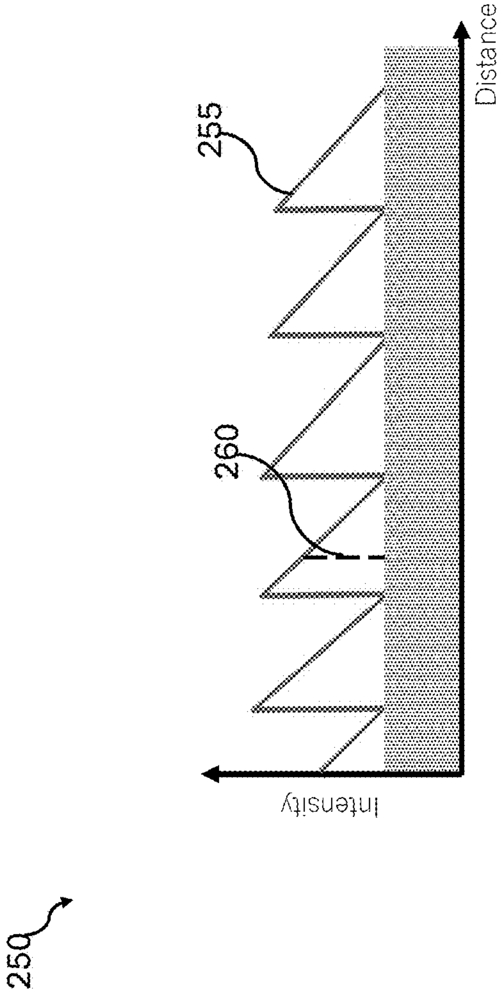
FIG. 2B is a graph of an output of a detector in an optical transmission system, in accordance with some embodiments.

FIG. 2B is a graph 250 of an output of a detector in an optical transmission system, in accordance with some embodiments. The graph 250 includes a plot 255 of intensity of the crosstalk portion of the reflected optical signal versus a distance from the transceiver 205 of the optical transmission system 200. The plot 255 indicates spikes in intensity following by declining of intensity until a next intensity spike. The intensity spike indicates a location of a repeater 215 along the optical fiber optical fiber 210. The declining intensity indicates how the intensity of the optical signal declines while propagating along the optical fiber optical fiber 210 between repeaters 215. The plot 255 indicates a designed performance of the optical transmission system 200. The plot 255 includes peaks having a consistent height which indicates proper performance of the repeaters 215. The plot 255 further includes steady intensity decline between repeaters 215, which indicates predicted intensity loss due to propagation of the optical signal along the optical fiber optical fiber 210.

The graph 250 further includes a potential fault plot 260. The potential fault plot 260 is a sharp decline in intensity indicates a potential fault within the optical transmission system 200. The sharp decline in intensity indicates that a break in the optical fiber optical fiber 210 potentially occurred. Utilizing the graph 250 the existence of the potential fault and a location of the potential fault, as a distance from the transceiver 205, are able to be identified. Other potential faults identifiable using the graph 250 include failure at a repeater due to an intensity peak having a lower amplitude or the peak having a u-shape or an n-shape indicating that the intensity change occurred across a longer distance.

By analyzing the data in the graph 250, both a type and a location of a potential fault are identifiable. A controller, such as controller 700 (FIG. 7) is then able to generate recommendations for resolving the potential fault, as discussed above with respect to the method 100 (FIG. 1), in some embodiments.

The optical transmission system 200 is capable of detecting a performance of the optical transmission system 200 without inclusion of components like optical circuits or FIFO devices. Further, being able to determine not just the existence of a fault, but a type of fault along with a location of the fault helps to determine what, if any, repairs are able to be implemented to improve performance of the optical transmission system 200. This helps to reduce complexity of the optical transmission system 200 in comparison with other approaches as well as reducing installation and maintenance costs for the optical transmission system 200 in comparison with other approaches.

While FIG. 2A includes the optical transmission system 200 sending an optical signal between two transceivers 205 and 225, one of ordinary skill in the art would understand that the optical transmission system 200 includes additional components in some embodiments. Additional components include features such as gratings, multiplexers, optical couplers, or other suitable components or directing optical signals to intended locations across an optical transmission network.

Figure 3A:
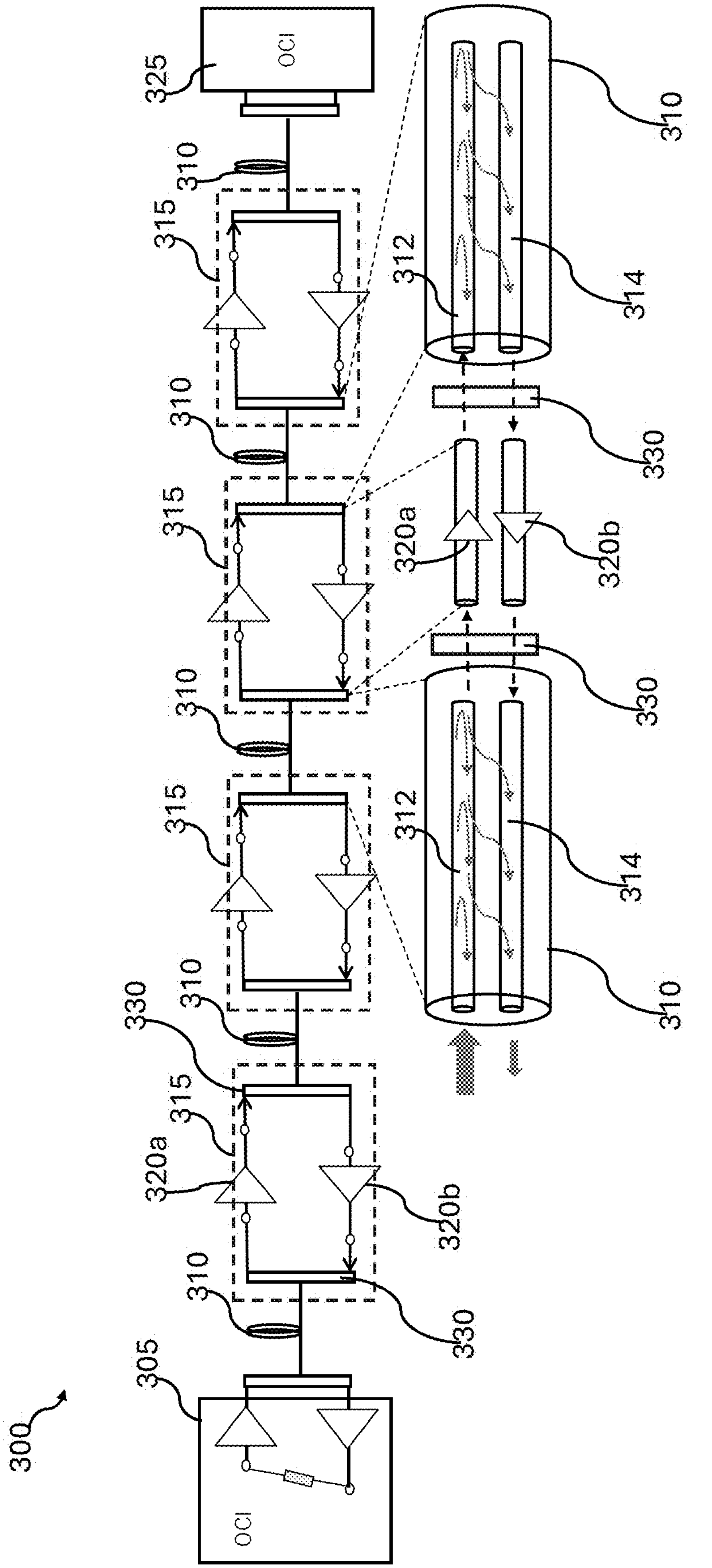
FIG. 3A is a schematic diagram of an optical transmission system, in accordance with some embodiments.

FIG. 3A is a schematic diagram of an optical transmission system 300, in accordance with some embodiments. In some embodiments, the optical transmission system 300 is usable to implement the method 100 (FIG. 1). In some embodiments, the optical transmission system 300 is usable to implement a method other than the method 100. The optical transmission system 300 includes a transceiver 305 configured to transmit an optical signal along an optical fiber 310 and to receive a reflected signal from the optical fiber 310. In some embodiments, the optical fiber 310 is an MCF. The optical transmission system 300 further includes a plurality of repeaters 315 spaced along the optical fiber 310 in order to boost an intensity of the optical signal. The optical transmission system 300 further includes a transceiver 325 on an opposite end of the optical fiber 310 from the transceiver 305. In some embodiments, the transceiver 325 has a same or similar structure as the transceiver 305. In some embodiments, at least one of the transceiver 305 or the transceiver 325 is configured to communicate with a controller, such as controller 700 (FIG. 7) for analyzing performance of the optical transmission system 300. For the sake of simplicity, a propagation direction from the transceiver 305 toward the transceiver 325 is called a forward direction; and a propagation direction from the transceiver 325 toward the transceiver 305 is called a backward direction. One of ordinary skill in the art would understand that this description is application to either transceiver 305 or transceiver 325 being a source of an optical signal; and that the above directions are used simply for clarity of description.

The transceiver 305 is similar to the transceiver 205 (FIG. 2A) and is not described in detail for the sake of brevity. The optical fiber 310 is similar to the optical fiber core 210 (FIG. 2A) and is not described in detail for the sake of brevity.

The optical transmission system 300 further includes repeaters 315 spaced along the optical fiber 310. The repeaters 315 are configured to boost an intensity of the optical signal propagating along the optical fiber 310. In comparison with the repeaters 215 (FIG. 2A), the repeaters 315 include FIFO devices 330 at an interface between the repeater 315 and the optical fiber 310. Details of the FIFO devices 330 are described below in FIG. 4, in accordance with some embodiments. The FIFO devices 330 help to connect a MCF of the optical fiber 310 to a single core EDF of the repeater 315. By including a FIFO device 330 on both sides of the repeater 315, the optical signals are transitioned from the MCF of the optical fiber 310 to the single core EDF of the repeater 315 for both forward propagation and backward propagation.

The repeater 315 includes a plurality of optical amplifiers 320*a* and 320*b*. the optical amplifiers 320*a* and 320*b* are similar to the optical amplifiers 220*a* and 220*b* (FIG. 2A) and are not described in detail for the sake of brevity. The repeater 315 in FIG. 3A includes one optical amplifier 320*a* for forward propagation and one optical amplifier 320*b* for backward propagation. One of ordinary skill in the art would recognize that additional optical amplifiers are within the scope of this description.

The optical transmission 300 further includes the transceiver 325. The transceiver 325 is configured to receive the optical signal output by the transceiver 305. In some embodiments, the transceiver 325 includes a same or similar structure as the transceiver 305.

FIG. 3A includes enlarged sections of the optical fiber 310 and a repeater 315. These enlarged sections provide additional details of the optical fiber 310 and the repeater 315 to assist in understanding of the current description. The optical fiber 310 includes a first optical fiber core 312 configured to carry the optical signal during forward propagation. The optical fiber 310 includes a second optical fiber core 314 configured to carry the optical signal during backward propagation. One of ordinary skill in the art would understand that more than two optical fiber cores within the optical fiber 310 is contemplated by this description. The optical amplifier 320*a* is connected to the first optical fiber core 312 for boosting the intensity of the optical signal as the optical signal propagates along the first optical fiber core 312. The optical amplifier 320*b* is connected to the second optical fiber core 314 to boost the intensity of the optical signal as the optical signal propagates along the second optical fiber core 314. The FIFO devices 330 are usable to optically connect the first optical fiber core 312 to the optical amplifier 320*a*; and to connect the second optical fiber core 314 to the optical amplifier 320*b*.

During operation of the optical transmission system 300, a portion of the optical signal propagating along the first optical fiber core 312 is reflected backward toward the transceiver 305. In some instances, this reflection is a result of Rayleigh scattering. In some embodiments, this reflection is a result of the optical signal encountering an interface between the first optical fiber core 312 and the optical amplifier 320*a*. In some embodiments, this reflection is a result of the optical signal encountering an interface between the first optical fiber core 312 and the FIFO devices 330. The reflected portion of the optical signal is conceptually depicted in FIG. 3A by the arrows which indicate a change of direction but remain within the first optical fiber core 312.

Further, during operation of the optical transmission system 300, some portion of the reflected optical signal propagating backward through the first optical fiber core 312 is transferred to the second optical fiber core 314 by crosstalk. Crosstalk occurs between the first optical fiber core 312 and the second optical fiber core 314 due to proximity of the optical fiber cores and optical coupling between the optical fiber cores. The crosstalk portion of the optical fiber core is conceptually depicted in FIG. 3A by the arrows which exit the first optical fiber core 312 and enter the second optical fiber core 314. Further, in some instances, crosstalk is introduced by the FIFO devices 330 at an interface between the FIFO devices 330 and the optical fiber 310.

The detector in transceiver 305 is configured to detect the crosstalk portion of the reflected optical signal from the second optical fiber core 314. Analyzing the output of the detection of the crosstalk portion of the reflected optical signal helps to determine performance of the optical transmission system 300. In some embodiments, analysis of the crosstalk portion of the reflected optical signal is implemented as described above with respect to the method 100 (FIG. 1). In some embodiments, the analysis of the crosstalk portion of the reflected optical signal is implemented using a method other than the method 100 (FIG. 1).

Figure 3B:
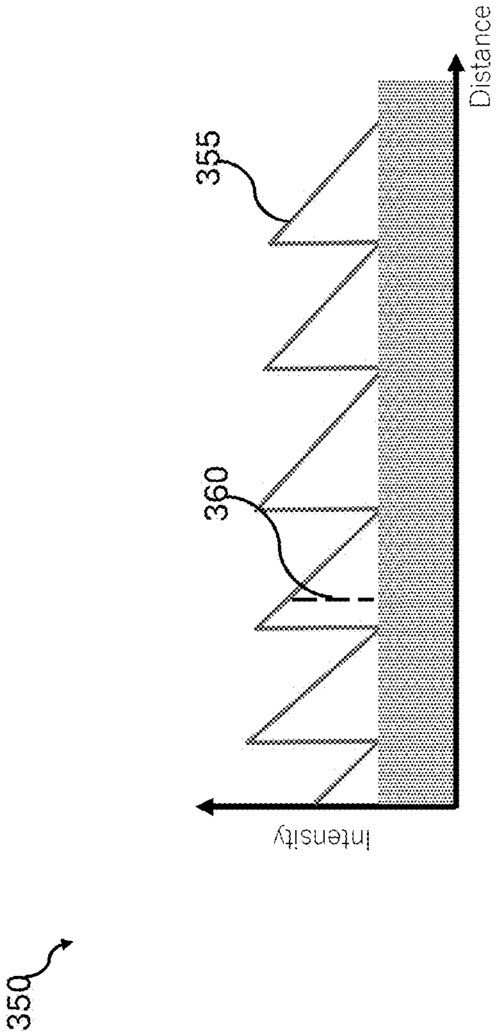
FIG. 3B is a graph of an output of a detector in an optical transmission system, in accordance with some embodiments.

FIG. 3B is a graph 350 of an output of a detector in an optical transmission system, in accordance with some embodiments. The graph 350 includes a plot 355 of intensity of the crosstalk portion of the reflected optical signal versus a distance from the transceiver 305 of the optical transmission system 300. The graph 350 further includes a potential fault plot 360. Analysis of the graph 350 is similar to analysis of the graph 250 (FIG. 2B) and is not described in detail for the sake of brevity.

The optical transmission system 300 is capable of detecting a performance of the optical transmission system 300 without inclusion of components like optical circuits. Further, being able to determine not just the existence of a fault, but a type of fault along with a location of the fault helps to determine what, if any, repairs are able to be implemented to improve performance of the optical transmission system 300. This helps to reduce complexity of the optical transmission system 300 in comparison with other approaches as well as reducing installation and maintenance costs for the optical transmission system 300 in comparison with other approaches.

While FIG. 3A includes the optical transmission system 300 sending an optical signal between two transceivers 305 and 325, one of ordinary skill in the art would understand that the optical transmission system 300 includes additional components in some embodiments. Additional components include features such as gratings, multiplexers, optical couplers, or other suitable components or directing optical signals to intended locations across an optical transmission network.

Figure 4:
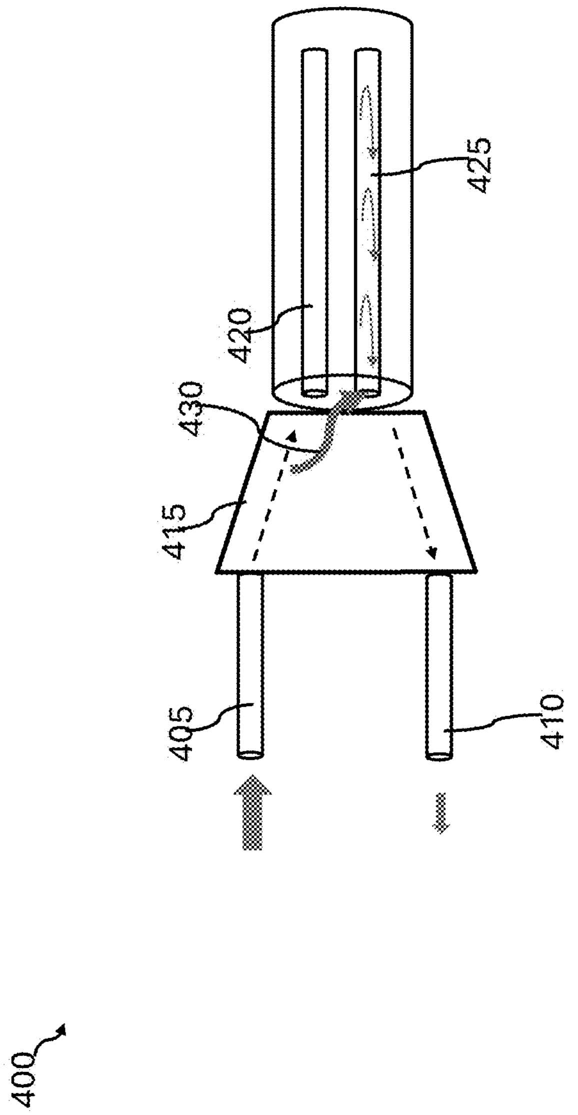
FIG. 4 is a schematic diagram of a fan-in-fan-out (FIFO) device, in accordance with some embodiments.

FIG. 4 is a schematic diagram of a fan-in-fan-out (FIFO) device 400, in accordance with some embodiments. The FIFO device 400 is configured to receive a signal from a first optical fiber core 405 and transfer the optical signal to a second optical fiber core 420. The FIFO device 400 is further configured to receive an optical signal from third optical fiber core 425 and transfer the optical signal to a fourth optical fiber core 410. The FIFO device 400 includes a spatial multiplexer or de-multiplexer 415. In some embodiments, the spatial multiplexer or de-multiplexer 415 is configured to facilitate transitioning between a SCF and a MCF for optical signal propagation in both directions. In some embodiments, the spatial multiplexer or de-multiplexer 415 is configured to multiplex or de-multiplex the optical signal based on frequency of the optical signal. In some embodiments, the spatial multiplexer or de-multiplexer 415 is configured to multiplex or de-multiplex the optical signal based on time. In some instances, during the multiplexing or demultiplexing the spatial multiplexer or de-multiplexer 415 produces crosstalk 430 due to a portion of the optical signal going to an unintended output. The FIFO device 400 is usable in different embodiments of the current description to permit connection between SCF components and MCF components of the optical transmission system.

Figure 5A:
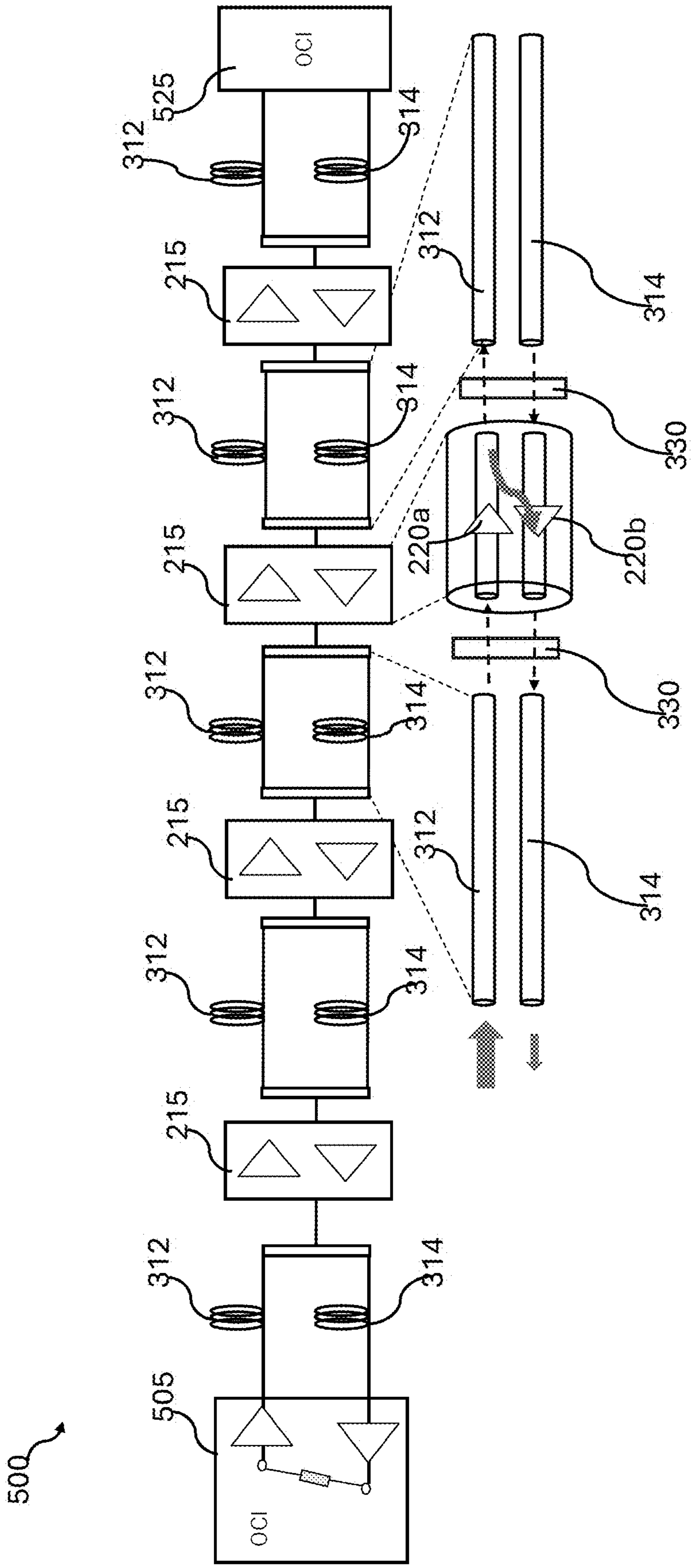
FIG. 5A is a schematic diagram of an optical transmission system, in accordance with some embodiments.

FIG. 5A is a schematic diagram of an optical transmission system 500, in accordance with some embodiments. In some embodiments, the optical transmission system 500 is usable to implement the method 100 (FIG. 1). In some embodiments, the optical transmission system 500 is usable to implement a method other than the method 100. The optical transmission system 500 includes a transceiver 505 configured to transmit an optical signal along an optical fiber core 312 and to receive a reflected signal from the optical fiber core 314. The optical transmission system 500 further includes a plurality of repeaters 215 spaced along the optical fiber core 312 and the optical fiber core 314 in order to boost an intensity of the optical signal. The optical transmission system 500 further includes a transceiver 525 on an opposite end of the optical fiber 312 from the transceiver 505. In some embodiments, the transceiver 525 has a same or similar structure as the transceiver 505. In some embodiments, at least one of the transceiver 505 or the transceiver 525 is configured to communicate with a controller, such as controller 700 (FIG. 7) for analyzing performance of the optical transmission system 500. For the sake of simplicity, a propagation direction from the transceiver 505 toward the transceiver 525 is called a forward direction; and a propagation direction from the transceiver 525 toward the transceiver 505 is called a backward direction. One of ordinary skill in the art would understand that this description is application to either transceiver 505 or transceiver 525 being a source of an optical signal; and that the above directions are used simply for clarity of description.

The transceiver 505 is similar to the transceiver 205 (FIG. 2A), and is not described in detail for the sake of brevity. The optical fiber core 312 and the optical fiber core 314 are described above with respect to optical transmission system 300 (FIG. 3A).

The optical transmission system 500 further includes repeaters 215 spaced along the optical fiber core 312 and the optical fiber core 314. The repeaters 215 are described above with respect to the optical transmission system 200 (FIG. 2A). In comparison with the optical transmission system 200 (FIG. 2A) and the optical transmission system 300 (FIG. 3A), the optical transmission system 500 includes FIFO devices 330 at between the repeater 215 and the optical fiber core 312. The FIFO devices 330 are also between the repeater 215 and the optical fiber core 314. Details of the FIFO devices 330 are described above in FIG. 4, in accordance with some embodiments. The FIFO devices 330 help to connect a SCF, that is, the optical fiber core 312 or the optical fiber core 314 to a multi core EDF of the repeater 215. By including a FIFO device 330 on both sides of the repeater 215, the optical signals are transitioned from the SCF of the optical fiber core 312 and the optical fiber core 314 to the multi core EDF of the repeater 215 for both forward propagation and backward propagation.

The optical transmission 500 further includes the transceiver 525. The transceiver 525 is configured to receive the optical signal output by the transceiver 505. In some embodiments, the transceiver 525 includes a same or similar structure as the transceiver 505.

FIG. 5A includes enlarged sections of the optical fiber cores 312 and 314 and a repeater 215. These enlarged sections provide additional details of the optical fiber cores 312 and 314 and the repeater 215 to assist in understanding of the current description. The optical fiber core 312 is configured to carry the optical signal during forward propagation. The optical fiber core 314 is configured to carry the optical signal during backward propagation. One of ordinary skill in the art would understand that more than two optical fiber cores is contemplated by this description. The optical amplifier 220*a* is connected to the first optical fiber core 312 for boosting the intensity of the optical signal as the optical signal propagates along the first optical fiber core 312. The optical amplifier 220*b* is connected to the second optical fiber core 314 to boost the intensity of the optical signal as the optical signal propagates along the second optical fiber core 314. The FIFO devices 330 are usable to optically connect the first optical fiber core 312 to the optical amplifier 220*a*; and to connect the second optical fiber core 314 to the optical amplifier 220*b*.

During operation of the optical transmission system 500, a portion of the optical signal propagating along the first optical fiber core 312 is reflected backward toward the transceiver 505. In some instances, this reflection is a result of Rayleigh scattering. In some embodiments, this reflection is a result of the optical signal encountering an interface between the first optical fiber core 312 and the optical amplifier 220*a*. In some embodiments, this reflection is a result of the optical signal encountering an interface between the first optical fiber core 312 and the FIFO devices 330. The reflected portion of the optical signal are similar to the above description and are not conceptually shown in FIG. 5A for clarity of the drawing.

Further, during operation of the optical transmission system 500, in some instances, crosstalk is introduced by the FIFO devices 330 at an interface between the FIFO devices 330 and the optical fiber cores 312 and 314. The crosstalk portion of the optical signal are similar to the above description and are not conceptually shown in FIG. 5A for clarity of the drawing.

The detector in transceiver 505 is configured to detect the crosstalk portion of the reflected optical signal from the second optical fiber core 314. Analyzing the output of the detection of the crosstalk portion of the reflected optical signal helps to determine performance of the optical transmission system 500. In some embodiments, analysis of the crosstalk portion of the reflected optical signal is implemented as described above with respect to the method 100 (FIG. 1). In some embodiments, the analysis of the crosstalk portion of the reflected optical signal is implemented using a method other than the method 100 (FIG. 1).

Figure 5B:
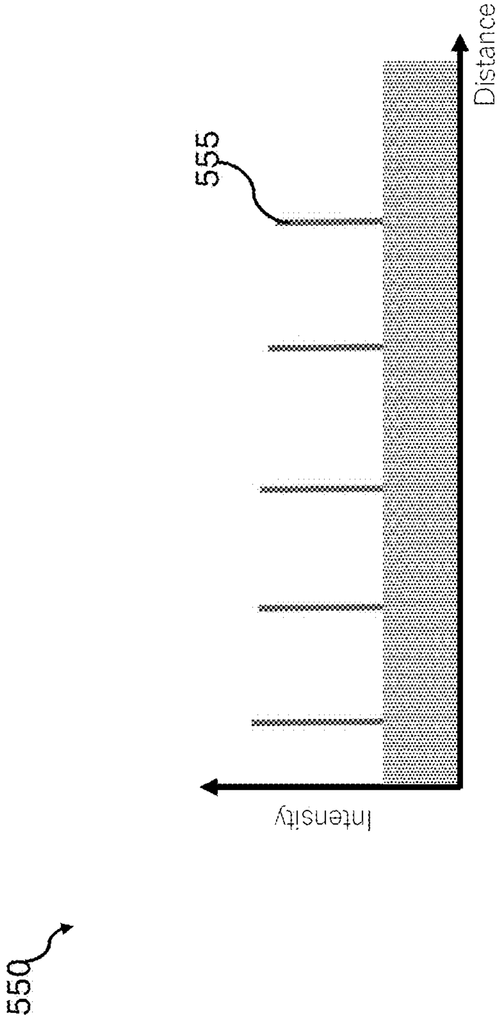
FIG. 5B is a graph of an output of a detector in an optical transmission system, in accordance with some embodiments.

FIG. 5B is a graph 550 of an output of a detector in an optical transmission system, in accordance with some embodiments. The graph 500 includes a plot 555 of intensity of the crosstalk portion of the reflected optical signal versus a distance from the transceiver 505 of the optical transmission system 500. In comparison to the graph 250 (FIG. 2B), the plot 555 does not include declining intensity between repeaters. Identification of potential faults within the optical transmission system 500 is possible based on peaks of the plot 555 being n-shapes or U-shaped. Potential faults are also identifiable based on a magnitude of a peak in the plot 555 being smaller than other peaks in the plot 555.

The optical transmission system 500 is capable of detecting a performance of the optical transmission system 500 without inclusion of components like optical circuits. Further, being able to determine not just the existence of a fault, but a type of fault along with a location of the fault helps to determine what, if any, repairs are able to be implemented to improve performance of the optical transmission system

500. This helps to reduce complexity of the optical transmission system 500 in comparison with other approaches as well as reducing installation and maintenance costs for the optical transmission system 500 in comparison with other approaches.

While FIG. 5A includes the optical transmission system 500 sending an optical signal between two transceivers 505 and 525, one of ordinary skill in the art would understand that the optical transmission system 500 includes additional components in some embodiments. Additional components include features such as gratings, multiplexers, optical couplers, or other suitable components or directing optical signals to intended locations across an optical transmission network.

Figure 6A:
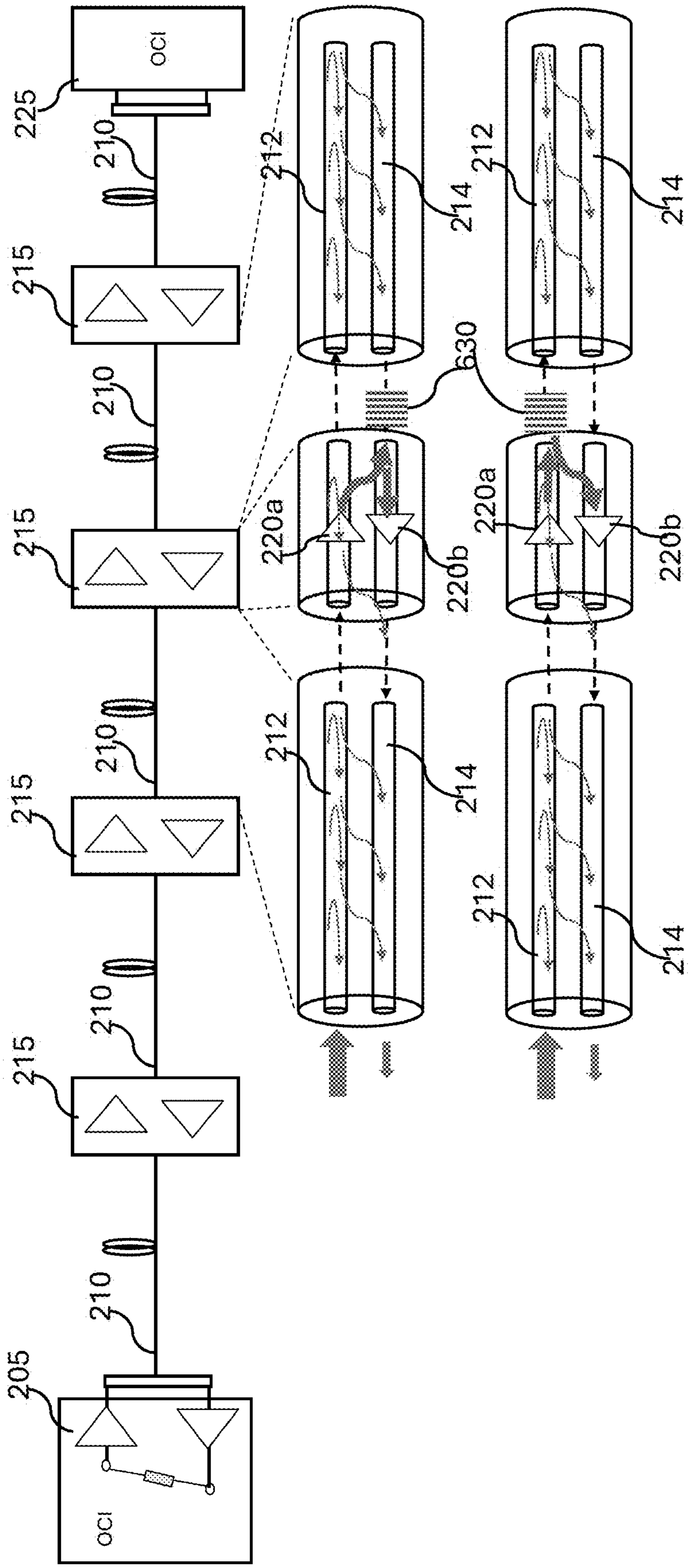
FIG. 6A is a schematic diagram of an optical transmission system, in accordance with some embodiments.

FIG. 6A is a schematic diagram of an optical transmission system 600, in accordance with some embodiments. In some embodiments, the optical transmission system 600 is usable to implement the method 100 (FIG. 1). In some embodiments, the optical transmission system 600 is usable to implement a method other than the method 100. The optical transmission system 600 includes a transceiver 205 configured to transmit an optical signal along an optical fiber 210 and to receive a reflected signal from the optical fiber 210. The optical transmission system 600 further includes a plurality of repeaters 215 spaced along the optical fiber 210 in order to boost an intensity of the optical signal. The optical transmission system 600 further includes a transceiver 225 on an opposite end of the optical fiber 210 from the transceiver 205. In some embodiments, the transceiver 225 has a same or similar structure as the transceiver 205. In some embodiments, at least one of the transceiver 205 or the transceiver 225 is configured to communicate with a controller, such as controller 700 (FIG. 7) for analyzing performance of the optical transmission system 600. For the sake of simplicity, a propagation direction from the transceiver 205 toward the transceiver 225 is called a forward direction; and a propagation direction from the transceiver 225 toward the transceiver 205 is called a backward direction. One of ordinary skill in the art would understand that this description is application to either transceiver 205 or transceiver 225 being a source of an optical signal; and that the above directions are used simply for clarity of description.

The transceiver 205 is described above with respect to optical transmission system 200 (FIG. 2A). The optical fiber 210 is described above with respect to optical transmission system 200 (FIG. 2A). The repeaters 215 are described above with respect to optical transmission system 200 (FIG. 2A). The transceiver 225 is described above with respect to optical transmission system 200 (FIG. 2A).

In comparison with the optical transmission system 200 (FIG. 2A), the optical transmission system 600 includes gratings 630. In some embodiments, the gratings 630 are in the first optical fiber core 212. In some embodiments, the gratings 630 are in the second optical fiber core 214. In some embodiments, the gratings 630 are in both the first optical fiber core 212 and the second optical fiber core 214. FIG. 6A includes the gratings 630 in a single location along the optical fiber 210. In some embodiments, the gratings 630 are positioned at various locations along the optical fiber 210 in any of the optical fiber cores in the optical fiber 210.

FIG. 6A includes multiple enlarged sections of the optical fiber 210 and a repeater 215. These enlarged sections provide additional details of the optical fiber 210 and the repeater 215 to assist in understanding of the current description. The optical fiber 210 includes a first optical fiber core 212 configured to carry the optical signal during forward propagation. The optical fiber 210 includes a second optical fiber core 214 configured to carry the optical signal during backward propagation. One of ordinary skill in the art would understand that more than two optical fiber cores within the optical fiber 210 is contemplated by this description. The optical amplifier 220*a* is connected to the first optical fiber core 212 for boosting the intensity of the optical signal as the optical signal propagates along the first optical fiber core 212. The optical amplifier 220*b* is connected to the second optical fiber core 214 to boost the intensity of the optical signal as the optical signal propagates along the second optical fiber core 214. The enlarged sections include examples of positions for the gratings 630. One of ordinary skill in the art would understand that these positions are merely examples and that other positions and additional gratings 630 are within the scope of this description.

During operation of the optical transmission system 600, a portion of the optical signal propagating along the first optical fiber core 212 is reflected backward toward the transceiver 205. In some instances, this reflection is a result of Rayleigh scattering. In some embodiments, this reflection is a result of the optical signal encountering an interface between the first optical fiber core 212 and the optical amplifier 220*a*. In some embodiments, this reflection is a result of the optical signal encountering the gratings 630. The reflected portion of the optical signal is conceptually depicted in FIG. 6A by the arrows which indicate a change of direction but remain within the first optical fiber core 212. In some embodiments, forward crosstalk occurs as the optical signal propagates along the first optical fiber core 212, and this forward crosstalk is reflected back to the transceiver 205 by the grating 630 in the second optical fiber core 214.

Further, during operation of the optical transmission system 600, some portion of the reflected optical signal propagating backward through the first optical fiber core 212 is transferred to the second optical fiber core 214 by crosstalk. Crosstalk occurs between the first optical fiber core 212 and the second optical fiber core 214 due to proximity of the optical fiber cores and optical coupling between the optical fiber cores. The crosstalk portion of the optical fiber core is conceptually depicted in FIG. 6A by the arrows which exit the first optical fiber core 212 and enter the second optical fiber core 214.

The detector in transceiver 205 is configured to detect the crosstalk portion of the reflected optical signal from the second optical fiber core 214. Analyzing the output of the detection of the crosstalk portion of the reflected optical signal helps to determine performance of the optical transmission system 600. In some embodiments, analysis of the crosstalk portion of the reflected optical signal is implemented as described above with respect to the method 100 (FIG. 1). In some embodiments, the analysis of the crosstalk portion of the reflected optical signal is implemented using a method other than the method 100 (FIG. 1).

Figure 6B:
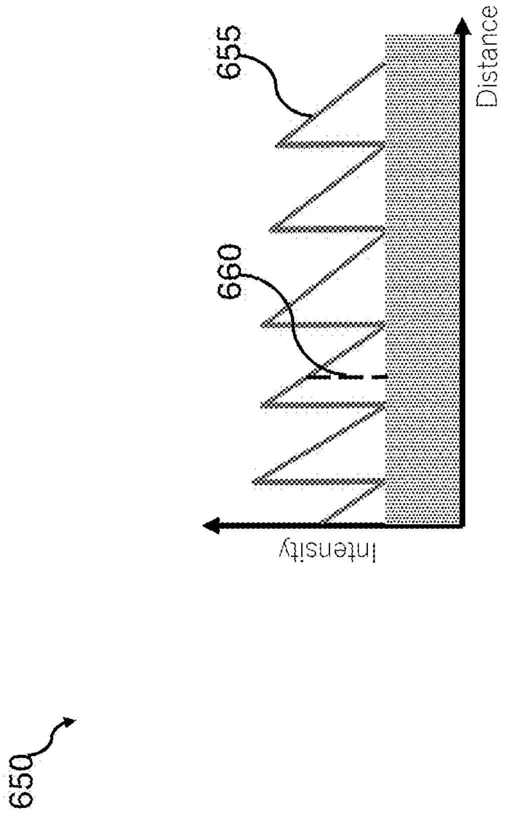
FIG. 6B is a graph of an output of a detector in an optical transmission system, in accordance with some embodiments.

FIG. 6B is a graph 650 of an output of a detector in an optical transmission system, in accordance with some embodiments. The graph 650 includes a plot 655 of intensity of the crosstalk portion of the reflected optical signal versus a distance from the transceiver 205 of the optical transmission system 600. The graph 650 further includes a potential fault plot 660. Analysis of the graph 650 is similar to analysis of the graph 250 (FIG. 2B) and is not described in detail for the sake of brevity.

The optical transmission system 600 is capable of detecting a performance of the optical transmission system 600 without inclusion of components like optical circuits or FIFO devices, in some embodiments. Further, being able to determine not just the existence of a fault, but a type of fault along with a location of the fault helps to determine what, if any, repairs are able to be implemented to improve performance of the optical transmission system 600. This helps to reduce complexity of the optical transmission system 600 in comparison with other approaches as well as reducing installation and maintenance costs for the optical transmission system 600 in comparison with other approaches.

While FIG. 6A includes the optical transmission system 600 sending an optical signal between two transceivers 205 and 225, one of ordinary skill in the art would understand that the optical transmission system 600 includes additional components in some embodiments. Additional components include features such as gratings, multiplexers, optical couplers, or other suitable components or directing optical signals to intended locations across an optical transmission network.

Further, while the optical transmission system 600 includes elements similar to the optical transmission system 200 (FIG. 2A), one of ordinary skill in the art would recognize that inclusion of the gratings 630, or similar structures, is also applicable to the optical transmission system 300 (FIG. 3A) and the optical transmission system 500 (FIG. 5A).

Figure 7:
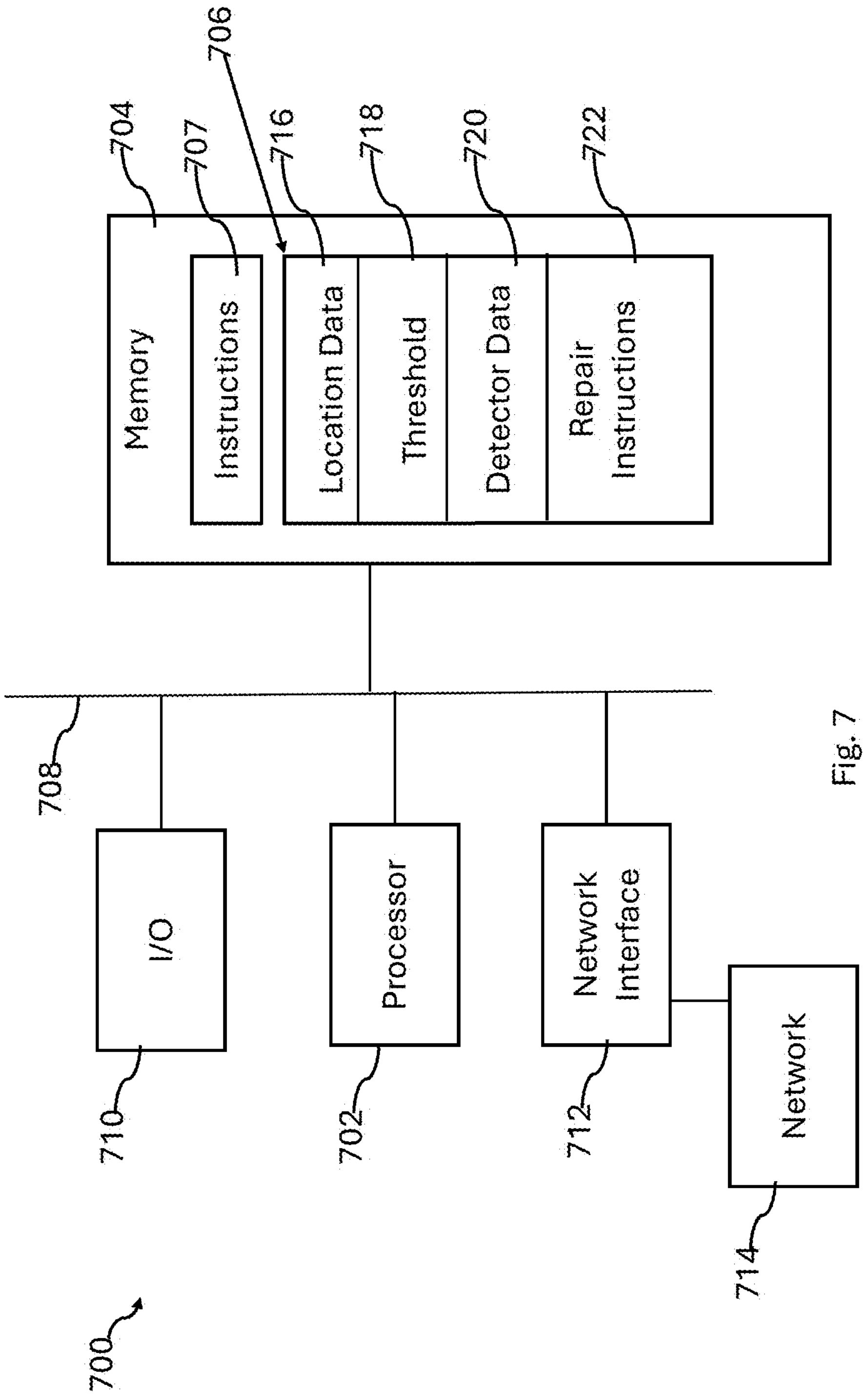
FIG. 7 is a block diagram of a controller usable in an optical transmission system, in accordance with some embodiments.

FIG. 7 is a block diagram of a controller 700 usable in an optical transmission system, in accordance with some embodiments. The controller 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with external devices. The processor 702 is electrically coupled to the computer readable storage medium 704 via a bus 708. The processor 702 is also electrically coupled to an input/output (I/O) interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause controller 700 to be usable for performing a portion or all of the operations as described in method 100 (FIG. 1), the optical transmission system 200 (FIG. 2A), the optical transmission system 300 (FIG. 3A), the optical transmission system 500 (FIG. 5A) or the optical transmission system 600 (FIG. 6A).

In some embodiments, the processor 602 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 704 stores the computer program code 706 configured to cause controller 700 to perform a portion or all of the operations as described in method 100 (FIG. 1), the optical transmission system 200 (FIG. 2A), the optical transmission system 300 (FIG. 3A), the optical transmission system 500 (FIG. 5A) or the optical transmission system 600 (FIG. 6A). In some embodiments, the storage medium 704 also stores information used for performing a portion or all of the operations as described in method 100 (FIG. 1), the optical transmission system 200 (FIG. 2A), the optical transmission system 300 (FIG. 3A), the optical transmission system 500 (FIG. 5A) or the optical transmission system 600 (FIG. 6A) as well as information generated during performing a portion or all of the operations as described in method 100 (FIG. 1), the optical transmission system 200 (FIG. 2A), the optical transmission system 300 (FIG. 3A), the optical transmission system 500 (FIG. 5A) or the optical transmission system 600 (FIG. 6A), such as a location data parameter 716, a threshold value parameter 718, a detector data parameter 720, a repair instructions parameter 722, and/or a set of executable instructions to perform a portion or all of the operations as described in method 100 (FIG. 1), the optical transmission system 200 (FIG. 2A), the optical transmission system 300 (FIG. 3A), the optical transmission system 500 (FIG. 5A) or the optical transmission system 600 (FIG. 6A).

In some embodiments, the storage medium 704 stores instructions 707 for interfacing with external devices, such as a terminal device accessible by the operator or the repair technician. The instructions 707 enable processor 702 to generate manufacturing instructions readable by the external devices to effectively implement a portion or all of the operations as described in method 100 (FIG. 1), the optical transmission system 200 (FIG. 2A), the optical transmission system 300 (FIG. 3A), the optical transmission system 500 (FIG. 5A) or the optical transmission system 600 (FIG. 6A).

Controller 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

Controller 700 also includes network interface 712 coupled to the processor 702. Network interface 712 allows controller 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in method 100 (FIG. 1), the optical transmission system 200 (FIG. 2A), the optical transmission system 300 (FIG. 3A), the optical transmission system 500 (FIG. 5A) or the optical transmission system 600 (FIG. 6A) is implemented in two or more controllers 700, and information such as location data, threshold values, detector data, and repair instructions are exchanged between different controllers 700 via network 714.

Supplemental Note 1

An optical transmission system includes a transceiver configured to output an optical signal to a first optical fiber core of a multi-core fiber (MCF), wherein the first optical fiber core is configured to reflect a portion of the optical signal back toward the transceiver. The optical transmission system further includes a second optical fiber core proximate the first optical fiber core, wherein the second optical fiber core is in the MCF, and the second optical fiber core is configured to receive crosstalk of the reflected portion of the optical signal from the first optical fiber core. The optical transmission system further includes a detector configured to receive the crosstalk of the reflected portion of the optical signal and generate detection data based on the crosstalk of the reflected portion of the optical signal. The optical transmission system further includes a controller configured to receive information related to the detection data, determine whether the optical transmission system is functioning properly based on the detection data, an determine a location of a fault in the optical transmission system in response to determining that the optical transmission system is functioning improperly.

Supplemental Note 2

The optical transmission system of Supplemental Note 1, further comprising a repeater connected to the first optical fiber core and the second optical fiber core, wherein the repeater is configured to boost an intensity of the optical signal.

Supplemental Note 3

The optical transmission system of any of Supplemental Notes 1 or 2, wherein the first optical fiber core is a multi core fiber (MCF), and the repeater is a multi core erbium-doped fiber (EDF).

Supplemental Note 4

The optical transmission system of any of Supplemental Notes 1 or 2, wherein the first optical fiber core is an MCF, and the repeater is a single core EDF.

Supplemental Note 5

The optical transmission system of any of Supplemental Notes 1 or 2, further comprising a grating in at least one of the first optical fiber core or the second optical core.

Supplemental Note 6

The optical transmission system of any of Supplemental Notes 1-5, further comprising a fan-in-fan-out (FIFO) device between the first optical fiber core and the repeater.

Supplemental Note 7

The optical transmission system of any of Supplemental Notes 1-6, wherein an interface between the first optical fiber core and the repeater is configured to reflect the portion of the optical signal.

Supplemental Note 8

The optical transmission system of any of Supplemental Notes 1-7, wherein an intensity of the reflected portion is less than about 20% of an intensity of the optical signal.

Supplemental Note 9

The optical transmission system of any of Supplemental Notes 1-8, further comprising a grating in the first optical fiber core, and the grating is configured to reflect the portion of the optical signal.

Supplemental Note 10

The optical transmission system of any of Supplemental Notes 1-9, wherein the optical transmission system is free of optical circuitry.

Supplemental Note 11

The optical transmission system of any of Supplemental Notes 1-10, wherein the optical transmission system is a submarine optical transmission system.

Supplemental Note 12

An optical transmission system includes a transceiver configured to output an optical signal to a first optical fiber core. The optical transmission system further includes a repeater connected to the first optical fiber core, wherein the repeater is configured to boost an intensity of the optical signal. The optical transmission system further includes a second optical fiber core proximate the first optical fiber core, wherein the second optical fiber core is configured to receive crosstalk from the first optical fiber core, and the second optical fiber core is configured to reflect a portion of the crosstalk of the optical signal back toward the transceiver. The optical transmission system further includes a detector configured to receive the reflected portion of the crosstalk of the optical signal and generate detection data based on the reflected portion of the crosstalk of the optical signal. The optical transmission system further includes a controller configured to receive information related to the detection data, determine whether the optical transmission system is functioning properly based on the detection data, and determine a location of a fault in the optical transmission system in response to determining that the optical transmission system is functioning improperly.

Supplemental Note 13

The optical transmission system of Supplemental Note 12, wherein the first optical fiber core is a multi core fiber (MCF), and the repeater is a multi core erbium-doped fiber (EDF).

Supplemental Note 14

The optical transmission system of Supplemental Note 12, wherein the first optical fiber core is an MCF, and the repeater is a single core EDF.

Supplemental Note 15

The optical transmission system of Supplemental Note 12, wherein the first optical fiber core is a single core fiber (SCF), and the repeater is a multi core EDF.

Supplemental Note 16

The optical transmission system of any of Supplemental Notes 12-15, further comprising a fan-in-fan-out (FIFO) device between the first optical fiber core and the—repeater.

Supplemental Note 17

The optical transmission system of any of Supplemental Notes 12-16, wherein an interface between the first optical fiber core and the repeater is configured to reflect the portion of the optical signal.

Supplemental Note 18

The optical transmission system of any of Supplemental Notes 12-17, further comprising a grating in the first optical fiber core, wherein the grating is configured to partially reflect the optical signal.

Supplemental Note 19

The optical transmission system of any of Supplemental Notes 12-18, further comprising a grating in the second optical fiber core, and the grating is configured to reflect the portion of the crosstalk of the optical signal.

Supplemental Note 20

A method of determining a performance of an optical transmission system includes transmitting an optical signal along a first optical fiber core. The method further includes reflecting a portion of the optical signal. The method further includes conveying the reflected portion of the optical signal to a second optical fiber core via crosstalk between the first optical fiber core and the second optical fiber core. The method further includes detecting the crosstalk of the reflected portion of the optical signal to generate detection data. The method further includes determining the performance of the optical transmission system based on the detection data. The method further includes identifying a location of a fault in the optical transmission system in response to a determination that the optical transmission system is performing improperly.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical transmission system comprising:

a transceiver configured to output an optical signal to a first optical fiber core, wherein the first optical fiber core is configured to reflect a portion of the optical signal back toward the transceiver;

a second optical fiber core proximate the first optical fiber core, wherein the second optical fiber core is configured to receive crosstalk of the reflected portion of the optical signal from the first optical fiber core;

a detector configured to receive the crosstalk of the reflected portion of the optical signal and generate detection data based on the crosstalk of the reflected portion of the optical signal;

a controller configured to:

receive information related to the detection data, determine whether the optical transmission system is functioning properly based on the detection data, and determine a location of a fault in the optical transmission system in response to determining that the optical transmission system is functioning improperly; and a repeater connected to the first optical fiber core and the second optical fiber core, wherein the repeater is configured to boost an intensity of the optical signal, wherein the first optical fiber core is a single core fiber (SCF), and the repeater is a multi core erbium-doped fiber (EDF).

2. The optical transmission system of claim 1, further comprising a grating in at least one of the first optical fiber core or the second optical core.

3. The optical transmission system of claim 1, further comprising a fan-in-fan-out (FIFO) device between the first optical fiber core and the repeater.

4. The optical transmission system of claim 1, wherein an interface between the first optical fiber core and the repeater is configured to reflect the portion of the optical signal.

5. The optical transmission system of claim 1, wherein an intensity of the reflected portion is less than about 20% of an intensity of the optical signal.

6. The optical transmission system of claim 1, further comprising a grating in the first optical fiber core, and the grating is configured to reflect the portion of the optical signal.

7. The optical transmission system of claim 1, wherein the optical transmission system is free of optical circuitry for returning the reflected portion of the optical signal to the detector.

8. The optical transmission system of claim 1, wherein the optical transmission system is a submarine optical transmission system.

9. An optical transmission system comprising:

a transceiver configured to output an optical signal to a first optical fiber core;

a repeater connected to the first optical fiber core, wherein the repeater is configured to boost an intensity of the optical signal;

a second optical fiber core proximate the first optical fiber core, wherein the second optical fiber core is configured to receive crosstalk from the first optical fiber core, and the second optical fiber core is configured to reflect a portion of the crosstalk of the optical signal back toward the transceiver;

a detector configured to receive the reflected portion of the crosstalk of the optical signal and generate detection data based on the reflected portion of the crosstalk of the optical signal; and a controller configured to:

receive information related to the detection data, determine whether the optical transmission system is functioning properly based on the detection data, and determine a location of a fault in the optical transmission system in response to determining that the optical transmission system is functioning improperly, wherein the first optical fiber core is a single core fiber (SCF), and the repeater is a multi core erbium-doped fiber (EDF).

10. The optical transmission system of claim 9, further comprising a fan-in-fan-out (FIFO) device between the first optical fiber core and the repeater.

11. The optical transmission system of claim 9, wherein an interface between the first optical fiber core and the repeater is configured to reflect the portion of the optical signal.

12. The optical transmission system of claim 9, further comprising a grating in the first optical fiber core, wherein the grating is configured to partially reflect the optical signal.

13. The optical transmission system of claim 9, further comprising a grating in the second optical fiber core, and the grating is configured to reflect the portion of the crosstalk of the optical signal.

14. A method of determining a performance of an optical transmission system, the method comprising:

transmitting an optical signal along a first optical fiber core;

boosting an intensity of the optical signal, by a repeater connected to the first optical fiber core;

reflecting a portion of the optical signal;

conveying the reflected portion of the optical signal to a second optical fiber core via crosstalk between the first optical fiber core and the second optical fiber core;

detecting the crosstalk of the reflected portion of the optical signal to generate detection data;

determining the performance of the optical transmission system based on the detection data; and identifying a location of a fault in the optical transmission system in response to a determination that the optical transmission system is performing improperly, wherein the first optical fiber core is a single core fiber (SCF), and the repeater is a multi core erbium-doped fiber (EDF).

* * * * *